United States Patent [19]
Sigrist

[11] 3,869,209
[45] Mar. 4, 1975

[54] APPARATUS FOR DETERMINING THE AMOUNT OF THE DISPERSED PHASE IN A SUSPENSION

[76] Inventor: Willy Sigrist, Ennetburgen, Switzerland

[22] Filed: Sept. 4, 1973

[21] Appl. No.: 394,520

Related U.S. Application Data

[63] Continuation-in-part of Ser. No. 237,733, March 24, 1972, Pat. No. 3,758,787.

[30] Foreign Application Priority Data
Mar. 29, 1971 Switzerland.......................... 4551/71

[52] U.S. Cl.................. 356/103, 250/574, 250/576
[51] Int. Cl.. G01n 21/00, G01n 21/06, G01n 21/26
[58] Field of Search................... 356/208, 103, 104; 250/574, 576

[56] References Cited
UNITED STATES PATENTS
3,758,787   9/1973   Sigrist................................ 250/574

*Primary Examiner*—James W. Lawrence
*Assistant Examiner*—T. N. Grigsby
*Attorney, Agent, or Firm*—Hans Berman; Kurt Kelman

[57] ABSTRACT

The amount of the dispersed phase in a suspension is determined by causing the suspension to flow in a free falling jet, directing a beam of light transversely on the jet, and measuring the light scattered and otherwise deflected by the jet by means of at least two photoelectric cells placed about the jet outside the incident light beam and its portion linearly transmitted by the jet. Three fixedly arranged photoelectric cells permit useful readings on dispersions of a wide variety of materials.

5 Claims, 3 Drawing Figures

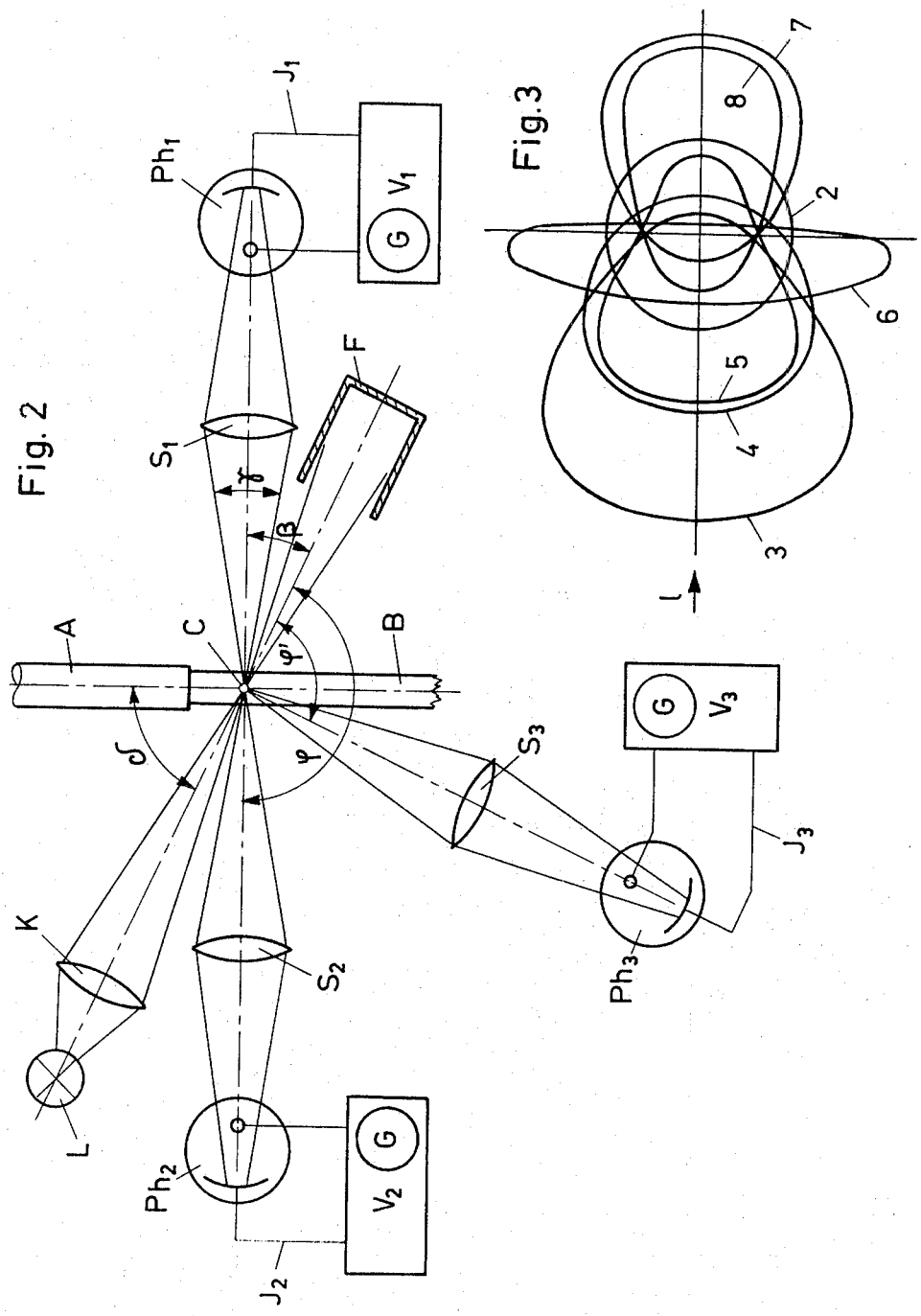

3,869,209

APPARATUS FOR DETERMINING THE AMOUNT OF THE DISPERSED PHASE IN A SUSPENSION

This application is a continuation-in-part of my copending application Serial No. 237,733, filed on Mar. 24, 1972, and now about to become U.S. Pat. No. 3,758,787.

This application relates to apparatus for determining the amount of the dispersed phase in a suspension, and particularly to an improvement in the apparatus covered by the afore-mentioned application.

In the earlier application, I disclosed apparatus whose basic elements include a nozzle suitable for discharging the suspension to be tested as an elongated jet. The light of a light source is directed toward the jet by a condensing lens system as an incident beam whose optical axis will be referred to hereinafter as the "second axis" intersecting the first, longitudinal axis of the jet. Light of the incident beam scattered by the jet is directed by a second lens system on a photoelectric cell so that an electrical signal indicative of the amount of scattered light is generated by the cell. The second lens system has an optical axis, hereinafter referred to as "third axis", which is inclined obliquely, and preferably at an angle of 15° to 40°, relative to a reference plane defined by the second axis and a straight line perpendicular to the first and second axes through the point of intersection of the first and second axes, the second lens system being spaced from the reference plane.

A third lens system directs light of the incident beam reflected from the jet toward another photoelectric element and has an optical fourth axis which defines an angle greater than 90° with the axis of that portion of the incident beam which is linearly transmitted by the jet. The last-mentioned portion of the incident beam is absorbed in a light trap spaced from the point of intersection of the first and second axes in the direction of the incident beam.

It was proposed in the earlier application to connect the two photoelectric cells in a circuit which generates signals indicative of a predetermined mathematical function of the difference of the amounts of light respectively received by the two cells, and such an arrangement was found effective in automatically correcting the values for amount of dispersed phase derived from the output of the first-mentioned photoelectric cell for errors due to light scattering mineral matter in suspensions of microorganisms.

As discussed in more detail in my paper "Zur Aussagekraft von optischen Truebungsmessungen" ("On the significance of optical turbidity measurements") in "Chemische Rundschau" (1973, No. 8, Feb. 21, 1973, Solothurn, Switzerland), the spatial distribution of light scattered by suspensions of solids or liquids in aqueous and other liquid media varies to a surprising extent with the nature of the dispersed phase, and it has been found that the afore-described apparatus of my earlier application is readily modified for measuring the amount of a wider variety of dispersed materials in a suspension, if the output of the photoelectric cell initially intended to measure reflected light and to provide a correction of the primary scattered light reading is uesed for furnishing a separate indication of the received light independent of the light reading of the other photoelectric cell. One more photoelectric cell, judiciously placed in the apparatus and provided with its own indicating device, permits the apparatus to be used to advantage for determining amounts of almost any suspended material.

Other features of this invention and the attendant advantages will readily be appreciated as the same becomes better understood from the following description of preferred embodiments when considered in connection with the appended drawing in which:

FIG. 2 illustrates another embodiment in a view corresponding to that of FIG. 1; and FIG. 3 is a diagram in polar coordinates showing the distribution of light scattered from an incident beam by suspensions of various finely divided materials.

Figure 1:
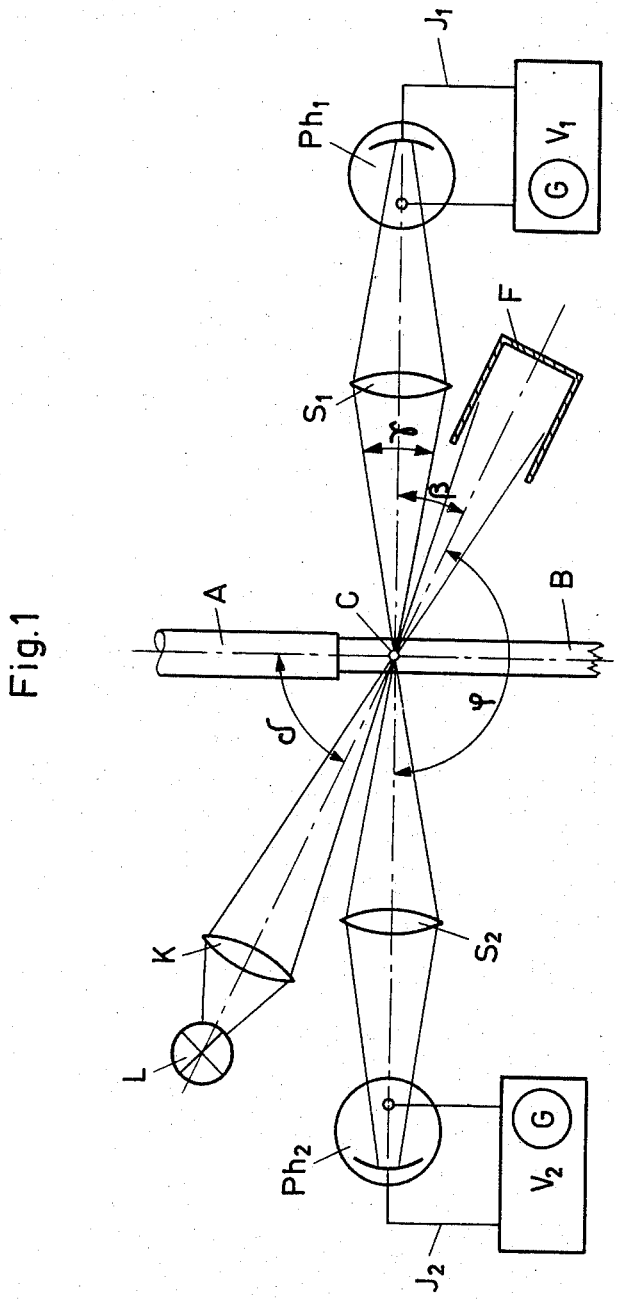
FIG. 1 shows a first embodiment of this invention in side elevation, and largely by conventional symbols.

Referring initially to FIG. 1, there is shown the discharge pipe or nozzle A of a pumping circuit from which a generally cylindrical jet B of the suspension to be tested is discharged downward so that the longitudinal axis of the jet is a straight line. The liquid may be water or a transparent organic material liquid at the testing temperature, and the suspended matter may consist of a wide variety of materials as will be exemplified hereinbelow with reference to FIG. 3.

Light emitted by an incandescent lamp L is focused by a condensing lens K on a point of intersection C with the longitudinal jet axis when the optical axis of the incident beam is directed by the lens K on the jet B. Light of the beam linearly transmitted by the jet B in the direction of the optical axis of the lens K is largely absorbed in a light trap F, which is a box having one open side and black internal walls. The incident beam and the transmitted beam are aligned and obliquely inclined to the axis of the jet B at an angle $\delta$ of approximately 60°, the specific value of this angle being not critical and determined, for example, by the need for providing space for the several optical elements of the apparatus about the point of intersection C.

Solid or liquid particles of a distinct second phase dispersed in the liquid of the jet B scatter light in all directions, but the intensity of the scattered light varies with its angular relationship to the optical axis of the incident beam. A collecting lens $S_1$ is arranged to receive some of the scattered light and to direct it on a photoelectric cell $P_1$, a selenium cell which generates an electric signal commensurate with the intensity of the scattered light received. The axis of the linearly transmitted portion of the beam from the light source L and the optical axis of the lens $S_1$ define an acute angle $\beta$ in the plane of FIG. 1. The two axes define a similar acute angle in a horizontal plane in the manner shown in FIG. 2 (angle $\alpha$) of the earlier application.

The apparatus described so far, and discussed in more detail in the earlier application, is eminently suitable for measuring the amount of dispersed butter fat in heavy cream or of microorganisms dispersed in a clear aqueous medium, when the entrance angle $\gamma$ of the lens $S_1$ is chosen to cover the range of most intense scattered light.

The optical axes of the lenses K and $S_1$ are shown in FIG. 1 to intersect each other in the point C, but such a precise intersecting of three axes is not needed for successful operation of the apparatus. The axis of the incident beam, which is the optical axis of the lens K, and a line perpendicular to the last-mentioned axis and to the longitudinal axis of the jet B in the point C define a plane of reference, perpendicular to the plane of FIG. 1, and it is necessary that the axis of the lens $S_1$ be obliquely inclined relative to the plane of reference in such a manner that the lens $S_1$ be located outside the plane, the angle $\beta$ being necessarily greater than 0°, and preferably between about 15° and 40° when microbial cells or optically similar materials constitute the disperse phase in the tested suspension.

In the embodiment of the invention illustrated in FIG. 1, the optical axis of a lens $S_2$ coincides with that of the lens $S_1$, the two lenses being arranged on opposite sides of the jet B so that the lens $S_2$ mainly receives light reflected by the jet and focuses the received light on a second photoelectric cell $Ph_2$. Generally, the angle $\phi$ defined by the axis of the lens $S_2$ and the axis of the linearly transmitted portion of the incident light beam should be at least 90°, but may be as great at 150°, although a maximum of 135° is adequate in many cases.

The apparatus of FIG. 1, as far as described so far, is closely similar in structure and function to the apparatus described in the afore-mentioned earlier application with reference to FIG. 4. However, the output circuits $J_1$, $J_2$ in the instant embodiment lead to separate indicating devices $V_1$, $V_2$, each equipped with a galvonometer G from which the amount of light received by the associated photoelectric cell may be read. If the dispersion tested contains mineral matter dispersed in an aqueous fluid also carrying microbial cells, the concentration of the microbial cells alone can be calculated from the readings of the two galvanometers and a chart based on empirical data, the reading obtained from the indicating device $V_1$ being corrected for the influence of the suspended mineral matter as read from the indicating device $V_2$.

However, it has been found that some dispersions such as skim milk deflect a sizable portion of incident light in a direction having a major component opposite to the incident beam. If the apparatus of FIG. 1 is employed for measuring the concentration of skim milk solids dispersed in an aqueous carrier liquid, the amount of light received by the photoelectric cell $Ph_2$ is of a similar order of magnitude as the light impinging on the cell $Ph_1$, and useful measurements cannot be obtained without combining the readings of both indicating devices according to empirical charts which need to be established for each type of tested suspension.

FIG. 3 shows the distribution of light deflected by aqueous dispersions of various materials from an incident beam 1 in polar coordinates. In order to compress the data within a convenient space, the light values measured are indicated in their relationship to corresponding measurements made on a standard dispersion of diatomaceous earth, so that the values for the standard suspension appear in FIG. 3 as a circle 2. Actually, the amount of light scattered in a forward direction by the standard suspension is about 500 times the rearward scattering, and the curves representing the distribution of light from suspensions of other materials are correspondingly distorted for the purpose of visualizing the various light distributions.

FIG. 3 also shows the curves 3 for skim milk, 4 for an epoxy resin (Araldite), 5 for European Brewery convention standard solution, 6 for titania, 7 for yeast cells, and 8 for heavy cream. Obviously, suspensions deflecting light in the different ways apparent from FIG. 3, cannot be handled interchangeably by the apparatus of the earlier application unless the photoelectric cells are movably mounted relative to the nozzle A, and necessary precautions are taken for securing them in precisely defined, reproducible relationship relative to the jet B and the light source L, a task which is not safely entrusted to inspectors in industrial plants in which the apparatus of the earlier application has found its most important application.

It has now been found that a modification of the apparatus of FIG. 1 which has no movable parts can furnish satisfactory readings indicative of the amount of any one of the suspended materials represented in FIG. 3, and of many others. Such a modification is illustrated in FIG. 2.

It differs from the device described above with reference to FIG. 1 by the provision of a third lens $S_3$ which receives light from the area of intersection of the light beam from the lamp L and the jet B, and focuses the received light on a third photoelectric cell $Ph_3$ whose output circuit $J_3$ is connected to an indicating device $V_3$ not significantly different from the indicating devices $V_1$, $V_2$. Useful values on the amount of disperse phase in the jet B can be obtained for virtually any type of dispersed material and any type of carrier liquid if the angle $\phi'$ between the axis of the linearly transmitted beam portion and the optical axis of the lens $S_3$ is approximately 90°, a range of 75° to 105° being permissible under most circumstances. The angular relationship of the lens $S_3$ to devices other than the beam of the lamp L and its incident and linearly transmitted portions is unimportant. While the lens $S_3$ and the associated photoelectric cell $Ph_3$ have been shown located in the plane of FIG. 2, they may be offset angularly from the illustrated position relative to the axis of the lens K in any desired manner.

The apparatus shown in FIG. 2 may be calibrated empirically for each of the very different substances for which light distributions are illustrated in FIG. 3.

Supporting structure and other conventional elements have been omitted from the showing of FIGS. 1 and 2, and the elements illustrated are represented by conventional symbols rather than by actual structural views. Thus, the simple lenses K, $S_1$, $S_2$, $S_3$ may be replaced by compound lenses, but also by mirrors, prisms, or other optical means in any desired manner, and the selenium photocells $Ph_1$, $Ph_2$, and $Ph_3$ may be replaced by other photoelectric devices capable of emitting an electric signal in response to received light. The several indicating devices $V_1$, $V_2$, $V_3$ and their indicating galvanometers may be replaced by a single indicating instrument and a switch which permits the instrument to be connected sequentially to the several photoelectric devices for receiving individual readings of their outputs. Three single-track or one three-track recorder may produce a visible indication of the amount of light directed against each of the three photoelectric cells shown in FIG. 2 by the associated lenses.

Where high precision of the measurements is essential, more than three photoelectric cells may be disposed relative to the axis of an incident beam in a manner obvious from the showing of FIG. 2.

It should be understood, therefore, that the foregoing disclosure relates only to preferred embodiments of the invention, and that it is intended to cover all changes and modifications of the examples of this invention herein chosen for the purpose of the disclosure which do not depart from the spirit and scope of the invention set forth in the appended claims.

What is claimed is:

1. Apparatus for determining the amount of the dispersed phase in a suspension comprising, in combination:
   a. nozzle means for discharging said suspension as a jet having a first longitudinal axis;
   b. a light source;
   c. first optical means for directing light of said source toward said jet as an incident beam having an optical second axis intersecting said first axis;
   d. a photoelectric element;
   e. second optical means for directing light of said beam scattered by said jet on said photoelectric element and for thereby causing said element to generate an electrical signal indicative of the amount of said scattered light,
      1. said second optical means having an optical third axis obliquely inclined relative to a reference plane defined by said second axis and a straight line perpendicular to said first and second axes through the point of intersection of said first and second axes,
      2. said second optical means being spaced from said plane;
   f. another photoelectric element;
   g. third optical means having an optical fourth axis and directing light of said incident beam reflected from said jet toward said other photoelectric element,
      1. the axis of the portion of said incident beam linearly transmitted by said jet and said fourth axis defining an angle of 90° to 150°;
   h. light trap means spaced from said point of intersection in the direction of said second axis away from said light source for absorbing the light of said source linearly transmitted by said jet; and
   i. indicating means in circuit with each of said photoelectric elements for producing a visible indication of the amount of light directed toward said elements by the associated optical means respectively.

2. Apparatus as set forth in claim 1, further comprising an additional photoelectric element, fourth optical means having an optical fifth axis and directing light of said incident beam deflected by said jet toward said additional photoelectric element, the axis of said portion of said incident beam linearly transmitted by said jet and said fifth axis defining an angle of 75° to 105°, and indicating means in circuit with said additional photoelectric element for producing a visible indication of the amount of light directed toward said additional photoelectric element by said fourth optical means.

3. Apparatus as set forth in claim 2, wherein the angle defined by said fifth axis and by the axis of said linearly transmitted portion is approximately 90°.

4. Apparatus as set forth in claim 2, wherein the angle defined by the axis of said linearly transmitted portion and said fourth axis is greater than the angle defined by the axis of said linearly transmitted portion and said fifth axis.

5. Apparatus as set forth in claim 1, wherein said third axis diverges from said reference plane at an angle of 15° to 40°C.

* * * * *